United States Patent
Yanagita

(10) Patent No.: US 12,502,775 B2
(45) Date of Patent: Dec. 23, 2025

(54) ROBOT SYSTEM AND ROBOT OPERATION METHOD

(71) Applicant: FANUC CORPORATION, Yamanashi (JP)

(72) Inventor: Akihiro Yanagita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 177 days.

(21) Appl. No.: 18/007,345

(22) PCT Filed: Sep. 6, 2021

(86) PCT No.: PCT/JP2021/032712
§ 371 (c)(1),
(2) Date: Jan. 30, 2023

(87) PCT Pub. No.: WO2022/054768
PCT Pub. Date: Mar. 17, 2022

(65) Prior Publication Data
US 2023/0278210 A1     Sep. 7, 2023

(30) Foreign Application Priority Data

Sep. 11, 2020   (JP) ................. 2020-152490

(51) Int. Cl.
*B25J 9/16*       (2006.01)
*B25J 11/00*      (2006.01)
*G05B 19/4067*    (2006.01)

(52) U.S. Cl.
CPC .......... *B25J 9/1664* (2013.01); *B25J 9/1653* (2013.01); *B25J 9/1674* (2013.01); *B25J 11/005* (2013.01)

(58) Field of Classification Search
CPC ...... B25J 9/1664; B25J 9/1653; B25J 9/1674; B25J 11/005; G05B 2219/50108; G05B 2219/50111; G05B 19/4067
See application file for complete search history.

(56) References Cited

U.S. PATENT DOCUMENTS 5,170,034 A * 12/1992 Seshimo ............ G05B 19/4067
                                                        901/42
5,170,109 A * 12/1992 Yanagita ............ G05B 19/4067
                                                        307/64
(Continued)

FOREIGN PATENT DOCUMENTS

JP   H03-104581 A    5/1991
JP   H06-047547 A    2/1994
(Continued)

OTHER PUBLICATIONS

International Search Report issued in PCT/JP2021/032712; mailed Nov. 22, 2021.

*Primary Examiner* — Harry Y Oh
(74) *Attorney, Agent, or Firm* — Studebaker Brackett PLLC

(57) ABSTRACT

The present invention addresses the issue of providing a robot system and a robot operation method whereby, even if an issue occurs with an EOAT (a tool attached to the tip of a robot arm) and repair is required during application processing work by a robot, that repair does not take a lot of time or effort, errors do not occur during restoration work, and the restoration can be conducted quickly. This issue is solved by the present invention being configured so as to enable application processing work to be resumed by a user program that had been interrupted, after: returning back along the path recorded during progress by the robot tool; causing the tool to exit the work region; removing the cause (Continued)

of the error; then moving forward again along the recorded tool path to return to the point at which the error occurred.

6 Claims, 13 Drawing Sheets

(56) References Cited

U.S. PATENT DOCUMENTS

| | | | | |
|---|---|---|---|---|
| 5,825,655 | A * | 10/1998 | Nakagawa | G05B 19/4067 |
| | | | | 700/192 |
| 2006/0009878 | A1 * | 1/2006 | Kobayashi | B25J 9/1671 |
| | | | | 700/245 |
| 2012/0265338 | A1 | 10/2012 | Keibel et al. | |

FOREIGN PATENT DOCUMENTS

| | | |
|---|---|---|
| JP | H06-102917 A | 4/1994 |
| JP | H08-047880 A | 2/1996 |
| JP | H09-050310 A | 2/1997 |
| JP | H10-011124 A | 1/1998 |
| JP | 2002-205167 A | 7/2002 |
| JP | 2006-012074 A | 1/2006 |
| WO | 2019/111413 A1 | 6/2019 |

* cited by examiner

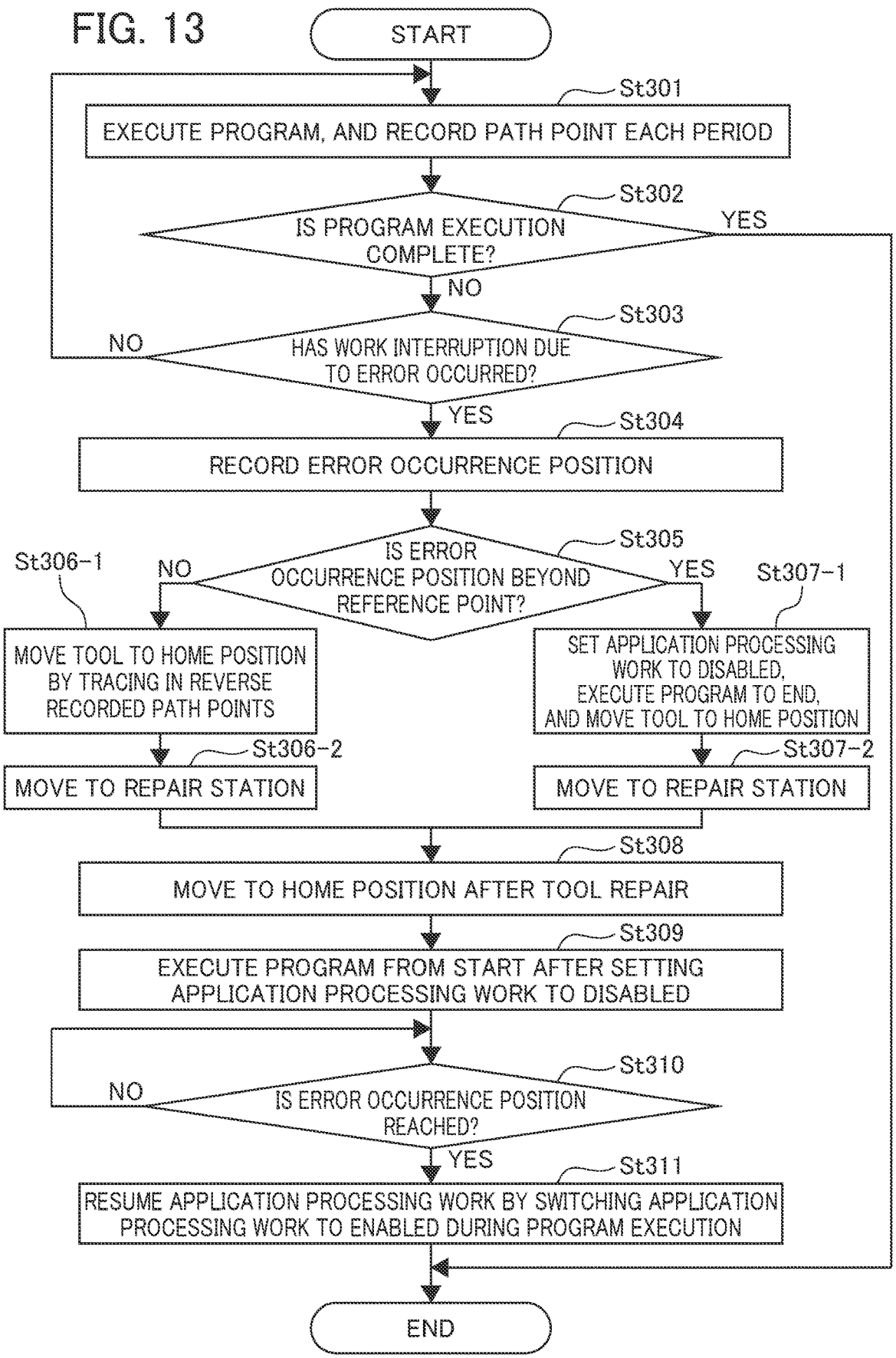

ROBOT SYSTEM AND ROBOT OPERATION METHOD

TECHNICAL FIELD

The present disclosure pertains to a robot system that performs application processing work while causing a tool attached to a robot arm tip to travel, and particularly pertains to a robot system and a robot operation method for resuming application processing work after an interruption while causing a tool on a robot arm tip to travel.

BACKGROUND ART

Application processing work such as coating work or welding work by a robot is performing application processing work while causing a tool or hand (EOAT: End of Arm Tooling) attached to a wrist portion of a robot arm tip to travel. When some kind of trouble has occurred for the EOAT and the application processing work is interrupted, the application processing work subsequent to the interruption is performed from the position where the application processing work was interrupted.

Patent Document 1 discloses that, in a case where a position at which application processing work using an EOAT (mobile body) was interrupted differs from the current position at which the EOAT (mobile body) actually stopped, first returning from the current position to the position at which the interruption occurred and then resuming application processing work from the position at which the interruption occurred take place.

Patent Document 1: Japanese Unexamined Patent Application, Publication No. H3-104581

DISCLOSURE OF THE INVENTION

Problems to be Solved by the Invention

However, no consideration is given in Patent Document 1 regarding work for repairing an EOAT for which trouble has occurred and a work region therefor. Accordingly, in a case where it has become necessary to repair an EOAT for which trouble has occurred, repair work is performed at the position where the EOAT (mobile body) stopped, but the position where the EOAT (mobile body) stopped is not always a position that is suitable for repair. For example, there may arise a case in which an obstacle such as other equipment approaching close to the position at which the EOAT (a mobile body) stopped, and it is impossible or very difficult to insert a repair tool to perform repairing.

Accordingly, consideration has been given to, in a case where application processing work using an EOAT is interrupted, performing repairing after causing the EOAT to temporarily move from the stop position to a position for the repairing, and returning the EOAT to the position where the application processing work was interrupted again to thereby continue the application processing work. If the EOAT has gone deep within a work region, this work incurs time and effort to take the EOAT out and put the EOAT back in without causing the EOAT to collide with other obstacles.

Various methods have been carried out in the past for such work to repair and return an EOAT to the original position of the EOAT after first causing the EOAT to exit. One of these is performed manually. This is a method in which, as illustrated in FIG. 1 for example, when some kind of error has occurred in coating work using a robot and an EOAT belonging to the robot has stopped, an operator of the robot for the moment manually moves the EOAT that belongs to the robot to a repair station for the EOAT.

A restoration procedure in such a case is as follows.

(1) After the stop due to an error, the operator uses a manual control panel to manually cause the EOAT belonging to the robot to move.
(2) The EOAT arrives at the repair station, and then a defect that the EOAT has is repaired.
(3) After completing the repair, the operator uses the manual control panel again to cause the EOAT to move to the error position (position at which the processing was interrupted).
(4) After the EOAT is returned to the error position, the interrupted application processing (coating work) is caused to resume.

By causing the EOAT to temporarily exit the work region, it is possible to smoothly perform a repair, but many problems occur for manual restoration work, such as requiring a human resource and taking time and effort, a higher likelihood for a mistake to arise during restoration work such as a collision with an obstacle or the like, and restoration taking time.

A second method for work to repair and return an EOAT to an original position for the EOAT after first causing the EOAT to exit is a method in accordance with an Exit Path program. This is a method in which, as illustrated in FIG. 2, when some kind of error has occurred in coating work using a robot and an EOAT belonging to the robot has stopped, an "Exit Path" (a user program for exiting) that has been taught in advance is executed, whereby the EOAT temporarily moves to a repair station for the EOAT.

A restoration procedure in such a case is as follows.

(1) After the stop due to the error, the "Exit Path" program that was taught in advance is executed to thereby cause the EOAT belonging to the robot to safely move to the EOAT repair station.
(2) The EOAT arrives at the repair station, and then a defect that the EOAT has is repaired.
(3) After the repair is completed, a "ReEnter" program that was taught in advance is executed to thereby cause the EOAT to move near to the error position (the position at which the processing was interrupted).
(4) After the EOAT is returned to the error position, the interrupted processing (coating work) is caused to resume.
(Note) In the above (3), in place of teaching the ReEnter program in advance, it is also possible to cause the EOAT to move near to the error position by executing the Exit Path program in reverse.

In a case where this technique is employed, there are advantages such as it is possible to perform restoration work more quickly, it is possible to avoid the occurrence of a mistake during restoration work such as a collision with an obstacle or the like, and it is also possible to automate all restoration work without intervention by a human resource. In contrast, there is the problem that, depending on the position where an error occurred, it is necessary to use a different exit path and it is necessary to teach a plurality of the "Exit Path" or "ReEnter" (user programs), which incurs time and effort.

A third method for work to repair and return an EOAT to an original position for the EOAT after first causing the EOAT to exit is to use a Fast Exit method. This is a technique in which, as illustrated in FIG. 3, after some kind of error has occurred in coating work using a robot and an EOAT belonging to the robot has stopped, application processing work (the coating work) is temporarily disabled and the user program for the application processing work is executed until the end thereof to thereby cause the EOAT to exit from a work region for the application processing work and safely move the EOAT to a repair station for the EOAT.

A restoration procedure in such a case is as follows.
(1) After stopping due to an error, the application processing work is temporarily set to disabled, and the user program for the application processing work (coating work) is caused to continue and execute until the end thereof for the moment. The EOAT belonging to the robot is then caused to safely move to the EOAT repair station.
(2) The EOAT arrives at the repair station, and then a defect that the EOAT has is repaired.
(3) Subsequently, the user program for the application processing work is executed from the start thereof with the application processing work set to disabled.
(4) When the EOAT has returned to the error position, the application processing work is reset to enabled, and the interrupted application processing work is resumed.

In a case where this technique is employed, there are advantages such as there being no need to separately teach an exit path, it is possible to avoid the occurrence of a mistake during restoration work such as a collision with an obstacle or the like, and it is also possible to automate all restoration work without intervention by a human resource. In contrast, there is the problem that, in a case where a user program for application processing work is long, it takes time for execution to complete after the user program was set to disabled and for the EOAT belonging to the robot to return to a home position.

As described above, in order to repair an EOAT for which trouble has occurred, causing the EOAT to temporarily exit, repairing the EOAT, and returning the EOAT to the original position has been conventionally performed, and a method of causing the EOAT to exit manually, a method that uses an Exit Path program, and a method that uses a Fast Exit method have been employed as techniques therefor. However, for the three types of techniques described above, problems arise for the method of causing an exit manually, such as requiring a human resource and taking time and effort, a higher likelihood for a mistake to arise during restoration work such as a collision with an obstacle or the like, and restoration taking time, problems occur for the method that uses an Exit Path program, such as needing to teach a plurality of the "Exit Path" (user programs) which takes time and effort, and problems arise for the Fast Exit method such as taking time for execution to complete after the user program is set to disabled and the EOAT belonging to the robot to return to a home position.

Accordingly, in application processing work using a robot, even in a case where trouble has occurred for an EOAT (tool attached to a robot arm tip) and the need to perform a repair has arisen, there is a need for a robot system and a robot operation method that, when causing the EOAT to exit the application processing work region and return after being repaired, is capable of quick restoration without incurring time for the restoration, without incurring time and effort by requiring a human resource or requiring a plurality of user programs to be taught, and without a mistake arising during restoration work, such as a collision with an obstacle or the like.

Means for Solving the Problems

In order to solve the above-described problems, a robot system and a robot operation method according to the present disclosure use a user program to perform application processing work while causing a tool attached to an arm tip of a robot to travel along a desired trajectory and, pertain to processing for resuming after application processing work is interrupted by an error occurring during execution of the user program. The robot system and robot operation method are able to trace in a reverse direction a path recorded during travel of the tool belonging to the robot to thereby cause the tool to exit from a work region, trace the recorded path for the tool in a forward direction after removal of an error cause to thereby return to an error occurrence point, and then resume the interrupted application processing work in accordance with the user program.

Effects of the Invention

By virtue of the robot system and robot operation method according to the present disclosure, even in a case where trouble has occurred for a tool attached to a robot arm tip and the need to perform a repair has arisen, when causing the tool attached to the robot arm tip to exit the application processing work region and return after being repaired, there is the effect of being able to quickly perform a restoration without incurring time for the restoration, without incurring time and effort by requiring a human resource or requiring a plurality of user programs to be taught, and without a mistake arising during restoration work, such as a collision with an obstacle or the like.

BRIEF DESCRIPTION OF THE DRAWINGS

FIG. 13 is a flow chart for a third implementation method according to the present disclosure.

PREFERRED MODE FOR CARRYING OUT THE INVENTION

Description is given below in detail regarding embodiments according to the present disclosure, with reference to the drawings.

In the following examples, paint coating processing work is given as an example of application processing work by an industrial robot, but this is purely an example, and the same technique can be applied to other application processing work (for example, coating with a sealing material, plasma irradiation, laser welding, arc welding, spot welding, etc.). In addition, in the following examples, a tool attached to a tip of a robot arm is referred to as an "EOAT" (End of Arm Tooling).

Figure 4:
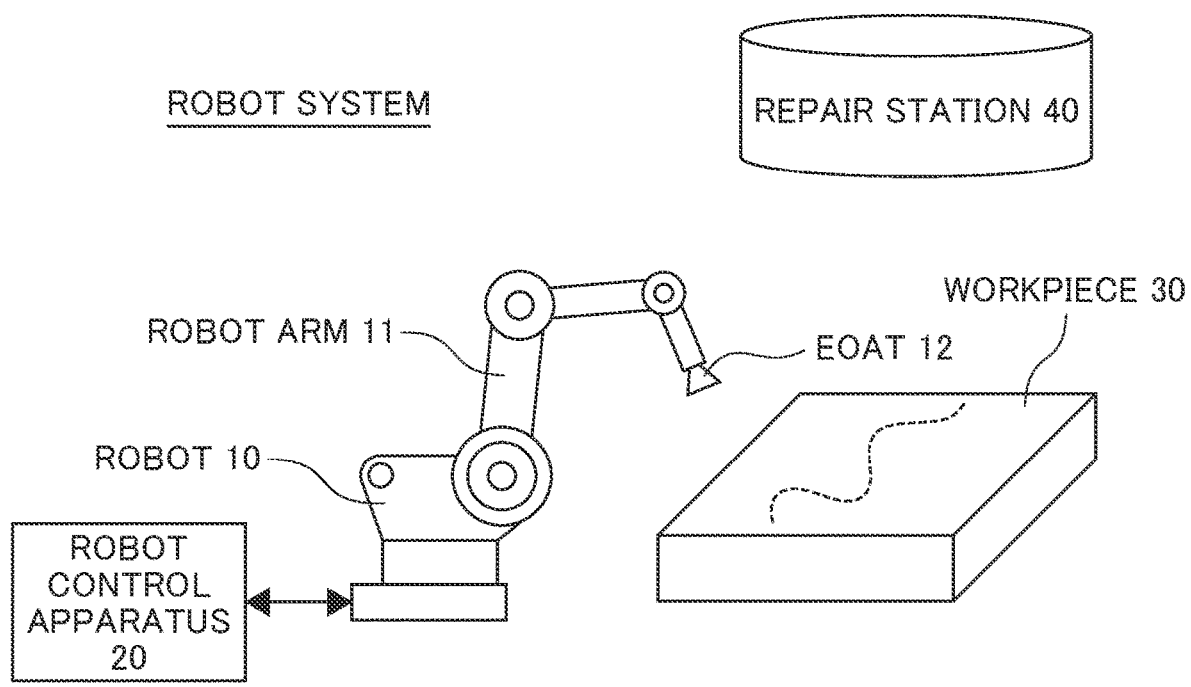
FIG. 4 is a block diagram of a robot system according to the present disclosure.

FIG. 4 is a block diagram of a robot system common to each embodiment according to the present disclosure. A robot 10 in the robot system illustrated in FIG. 4 is an articulated robot that has a robot arm 11 that includes a plurality of joints. An EOAT 12 for coating paint onto a workpiece 30 is attached to a tip of the robot arm 11. Coating work is performed by the robot control apparatus 20 controlling servomotors 14 (FIG. 6) that are incorporated in respective joints in the robot arm 11 belonging to the robot 10 and causing the robot arm 11 to operate such that the EOAT 12 moves at a predetermined speed along a curve trajectory that smoothly joins a series of operation commands (teaching positions) taught within a user program to thereby eject paint at a predetermined flow rate in an instant when the EOAT 12 has reached a predetermined position, while causing the EOAT 12 to move at the predetermined speed along a predetermined curve trajectory on the workpiece 30. In addition to teaching position information for the EOAT 12, information necessary for application processing work is written in the user program, such as a movement speed, mode of operation (type of movement, such as linear, an arc, a spline curve, or the like), a paint discharge position, and a discharge flow rate for the EOAT 12.

The robot system in FIG. 4 is provided with a repair station 40 for, when an error has occurred during execution of a user program due to trouble for the EOAT 12, repairing the EOAT 12 and removing a cause why the error occurred. The repair station 40 is provided outside of a region required for coating work by the EOAT 12. When an error has occurred during execution of a user program due to trouble for the EOAT 12, the robot control apparatus 20 causes the EOAT 12 to exit from a region that is necessary for coating work, and subsequently causes the EOAT 12 to move to the repair station 40. The repair station 40 can repair various types of EOAT 12 in accordance with details of the trouble for the EOAT 12.

Figure 5:
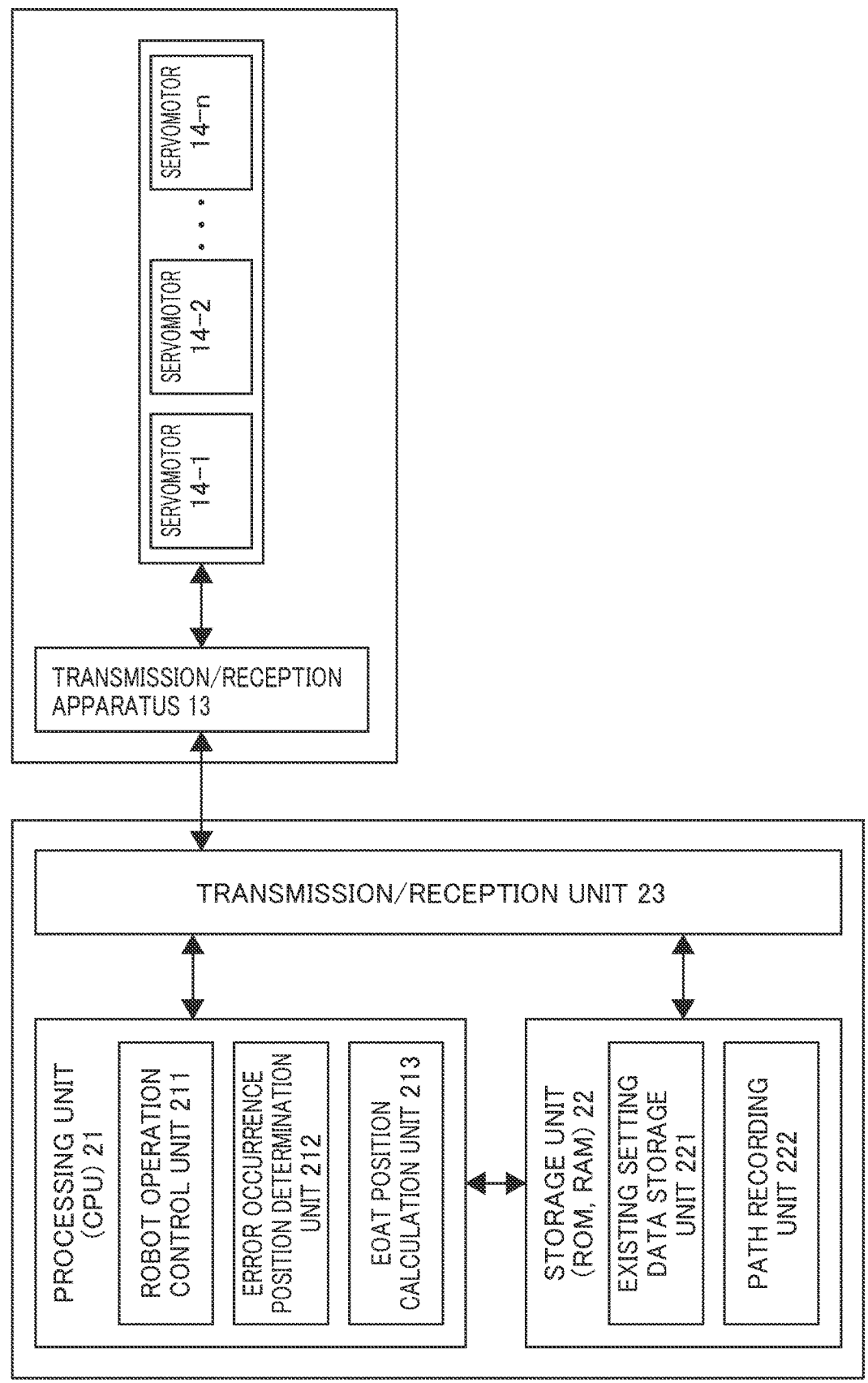
FIG. 5 is a block diagram that illustrates a sending and receiving relationship for signals at a time of robot control according to the present disclosure.

FIG. 5 is a block diagram that illustrates a sending and receiving relationship for signals at a time of controlling robot operation, between the robot control apparatus 20 and the robot 10, between respective units in the robot control apparatus 20, and between respective members belonging to the robot 10. The robot control apparatus 20 has, as components, a processing unit (CPU) 21 that includes a microcomputer, etc.; a storage unit 22 that includes a memory member such as a ROM and a RAM; and a transmission/reception unit 23 that transmits and receives signals to and from the robot 10.

The robot 10 is provided with a transmission/reception apparatus 13 that transmits and receives signals to and from the robot control apparatus, and a plurality of servomotors 14-1, 14-2, ..., 14-n that are incorporated in, inter alia, respective joints belonging to an arm in order to move the arm.

The processing unit 21 is provided with a robot operation control unit 211 for controlling operation by the robot 10 such that the EOAT 12 on the tip of the robot arm 11 can trace a predetermined trajectory in accordance with a user program to thereby perform coating work or move by following a recorded trajectory, and an error occurrence position and error stop position determination unit 212 that performs recognition regarding an error occurrence point, such as determining whether an error occurrence point is a location that is beyond a predetermined reference point, for example, in a case where an error has occurred during execution of the user program and the user program is interrupted. In addition, the processing unit 21 is also provided with an EOAT position calculation unit 213 for obtaining, via the transmission/reception apparatus 13 in the robot 10 and the transmission/reception unit 23 in the robot control apparatus 20, signals from the servomotors 14-1, 14-2, ..., 14-n in the robot 10, and calculating the position of the EOAT 12.

The storage unit 22 in the robot control apparatus 20 is provided with an existing setting data storage unit 221 in which is stored existing setting data such as teaching data or a user program for performing coating while the EOAT 12 belonging to the robot 10 moves by tracing a desired trajectory, and a path recording unit 222 for recording a path that the EOAT 12 has traced while the user program is executing.

In the robot 10, the plurality of servomotors 14-1, 14-2, ..., 14-n are caused to rotate in accordance with a command signal received from the robot control apparatus 20, the EOAT position calculation unit 213 in the robot control apparatus 20 calculates position data each specific period for the EOAT 12 from data regarding an actual rotation number for each servomotor that was detected at a specific period in each of the servomotors 14-1, 14-2, ..., 14-n, and the position data is stored in the path recording unit 222 in the storage unit 22 as data regarding the EOAT position for each specific period. Note that a technique for calculating the EOAT position is not matter that relates to the essence of the present disclosure and, in the present embodiment, it is assumed that the EOAT position is calculated from data regarding the actual rotation number for each servomotor, but, for example, the EOAT position may be obtained from data detected using an EOAT detection apparatus (such as a camera) that is mounted to a specific location.

Based on, inter alia, data such as a user program read out from the existing setting data storage unit 221 in the storage unit 22 and path recording data that has been fed back from the robot 10 and is stored in the path recording unit 222, the robot operation control unit 211 in the processing unit 21 in the robot control apparatus 20 calculates a command signal for the plurality of servomotors 14-1, 14-2, ..., 14-n in the robot 10, sends the command signal to each of the servomotors 14-1, 14-2, ..., 14-n through the transmission/reception unit 23 and the transmission/reception apparatus 13 to thereby control operation by the robot 10 and cause the EOAT 12 to perform coating work. In addition, when an error has occurred during coating work—in other words during execution of a user program—and the coating work is interrupted, the error occurrence point determination unit 212 in the processing unit 21, based on, inter alia, data such as the user program read out from the existing setting data storage unit 221 and path recording data stored in the path recording unit 222, determines whether the error occurrence point is a location that is beyond a predetermined reference point.

Next, description is given regarding a method of controlling movement operation for the EOAT 12 on the robot arm tip pertaining to coating work according to an embodiment of the present disclosure, in other words a method for resuming after an error has occurred during coating work and the coating work is interrupted. It is necessary for functions described next to be provided in order to implement resuming after such an interruption for coating work.

Figure 6:
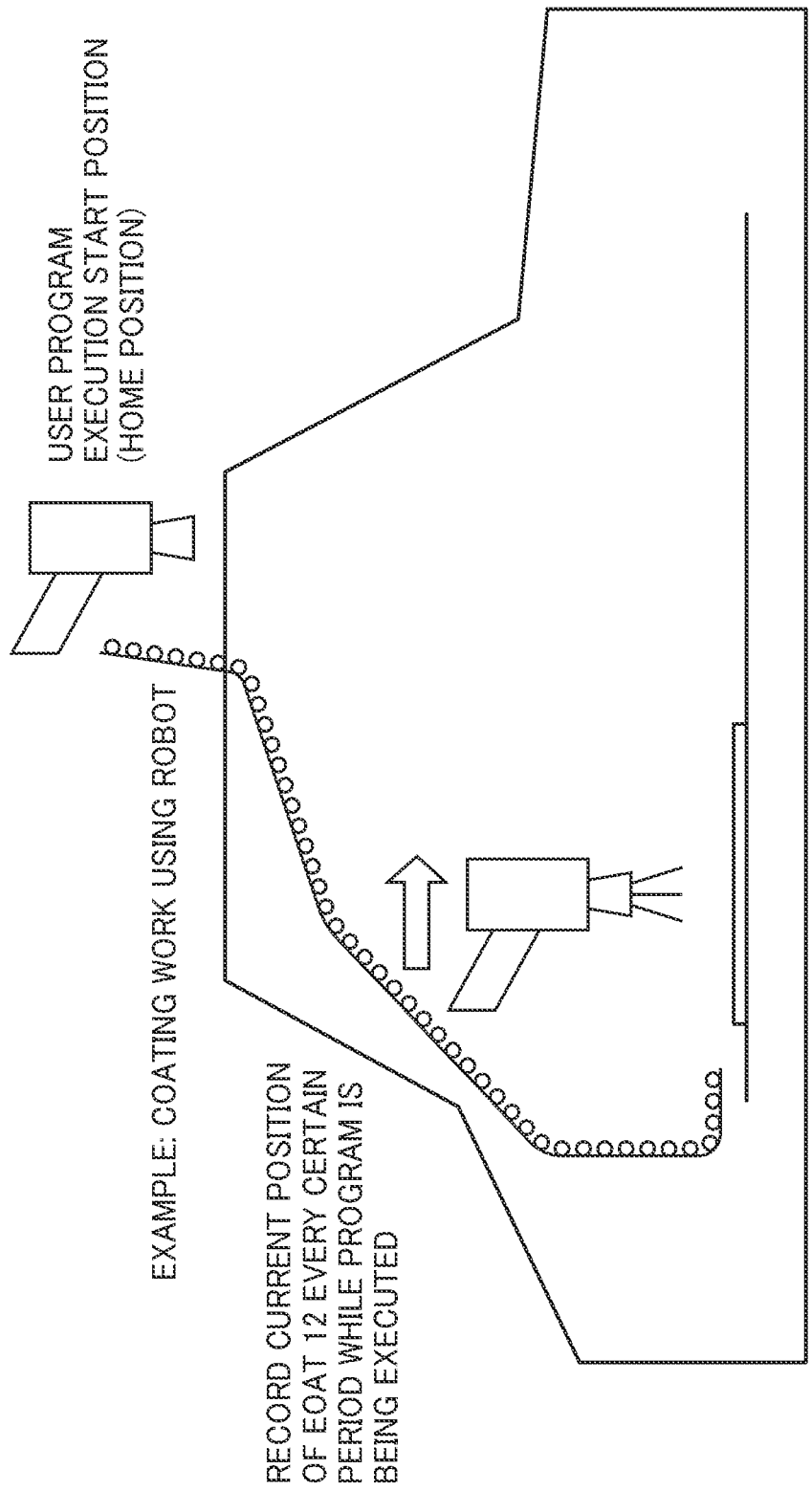
FIG. 6 is a schematic view for giving a description regarding functionality provided by the invention according to the present disclosure.

The first function needed to implement resuming after coating work is interrupted is a function that is illustrated by the schematic view in FIG. 6 and is for recording the current position of the EOAT 12, which belongs to a robot, every certain period from a position designated in a user program during execution of the user program. In order to implement this function, it is necessary to reserve a memory region having capacity of a sufficient size in the path recording unit 222 (FIG. 5) in the storage unit 22 in the robot control apparatus 20. However, there is no need to record all motion by the robot, it is possible to designate a timing for starting recording in a user program, and it is also possible to interrupt/resume processing for recording positions within the user program, as necessary.

Figure 7:
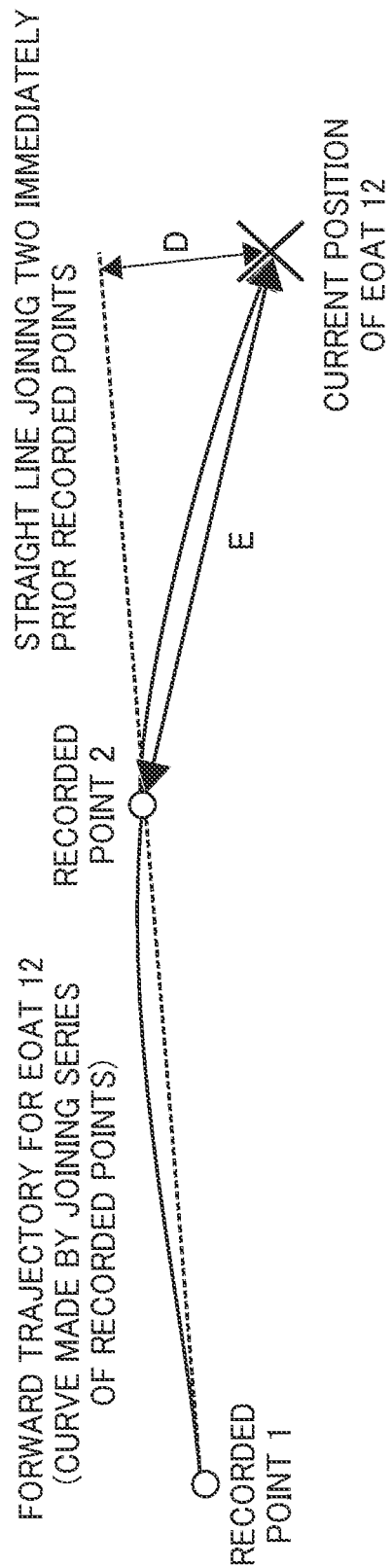
FIG. 7 is a view for giving a description regarding recorded points in a forward trajectory for a tool on a robot arm tip.

At this time, when the position of the EOAT 12 is recorded at all interpolation points—in other words at all command positions calculated for the purpose of robot operation—an enormous storage capacity is necessary. Therefore, a period at which the position of the EOAT 12 is recorded is set to something necessary and sufficient. As an example, a technique of recording the current position at a time when a distance D from a straight line connecting two points recorded in the past to the current position of the EOAT 12 has become equal to or greater than a certain limit, as illustrated in FIG. 7, may be given. In addition, combining with a method that records the current position at a time when a distance E from the previous recorded point to the current position has become equal to or greater than a certain limit, even if the distance D is small, is worth considering.

Figure 8:
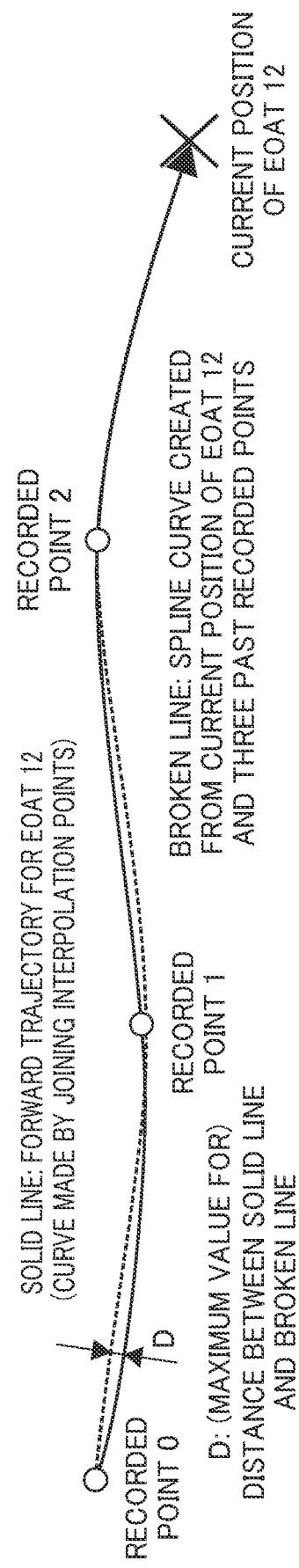
FIG. 8 illustrates a spline curve that smoothly joins a series of position data.

When performing a retrograde operation following recorded positions for the EOAT 12, it is possible to cause movement linearly from one recorded point to the next recorded point, but in this case, there will be a certain level of deviation from the actual trajectory of the EOAT 12, as illustrated in FIG. 8. By calculating and tracing a curve (spline curve) that smoothly joins a series of position data, it is possible to reduce deviation from the actual trajectory. In FIG. 7 described above, by making the distance D, which is used as an index for recording the current position, be the distance from a spline curve obtained from recorded positions that were recorded in the past to the current position, it is possible to lengthen the period for recording, and it becomes possible to record positions while reserving a memory region with a smaller capacity.

The second function needed to implement resuming after coating work is interrupted is a function that can finely adjust, forward or backward, a resumption position for coating work. This is required to, when resuming the coating work, prevent a blank portion or an overlapping portion from arising between a region that is already coated and a region to be coated in accordance with the resumption.

The third function needed to implement resuming after coating work is interrupted is a function that can finely adjust, up or down, the height position of the EOAT 12 in a duration until a time of resumption after the coating work is interrupted, and can cancel the fine adjustment immediately after the coating work is resumed to thereby return to the height for an original teaching position. This is needed such that a location that has already been coated is not damaged due to movement by the EOAT 12.

Next, as methods for resuming after coating work is interrupted as described above, description is given for three embodiments in order with reference to the drawings.

Figure 9:
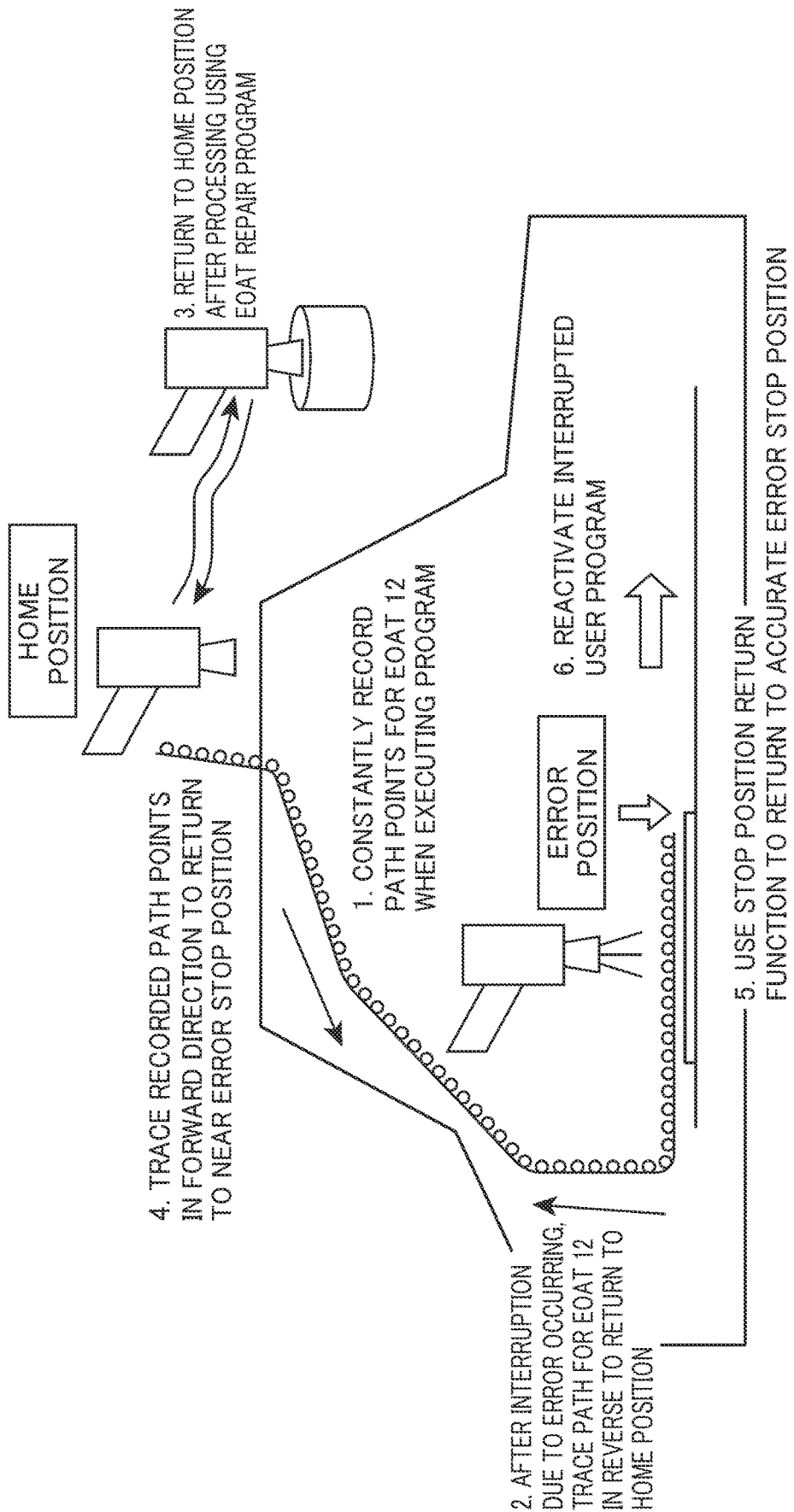
FIG. 9 is a schematic view of a first implementation method according to the present disclosure for causing a tool on a robot arm tip to exit from a work region, repairing the tool, and then causing processing to resume from an original position.

FIG. 9 is a schematic view for describing a first embodiment which corresponds to a method for resuming after coating work is interrupted. The first method is, as illustrated in FIG. 9, after an interruption due to an error occurring, exiting by tracing in reverse a path that had been recorded when the user program was executing until the position at which position recording started is reached; returning, after the repair, to the error stop position by tracing the recorded path again in the forward direction; and resuming the interrupted user program from the error stop position.

A processing procedure for this embodiment is as illustrated in FIG. 9, and is as follows.

(1) During execution of a user program, the position of the EOAT 12 is recorded in a buffer region (path recording unit 222 in FIG. 5) every specific period.

(2) After interruption due to an error occurring, the robot operation control unit 211 separately stores the position where the robot arm 11 stopped as an "error stop position". At the same time, the robot operation control unit 211 saves context (such as variable values, an execution step number, a subprogram call nesting situation, and operation plan information) for program execution such that it is possible to subsequently resume the interrupted user program. Thereafter, the EOAT 12 is caused to safely exit the work region, a "backward exit" command is executed in accordance with a command from an external unit or executed automatically, the positions of the EOAT 12 that was recorded in the buffer region (path recording unit 222 in FIG. 5) are traced in reverse to cause the EOAT 12 to move to the position (a home position) at which position recording started.

(3) A defect for the EOAT 12 is corrected. The EOAT 12 is repaired manually by an operator or by executing a repair program that was created by a user. This case includes operation to move (jog) the EOAT 12 manually or move the EOAT 12 using the repair program. After the defect for the EOAT 12 is corrected, the EOAT 12 is returned to the home position.

(4) In order to return the EOAT 12 to the error stop position, a "forward re-entry" command is executed, positions recorded in the buffer region (path recording unit 222 in FIG. 5) are traced in the positive direction, and the EOAT 12 is caused to move from the home position to the error stop position. At this time, strictly speaking the EOAT 12 returns to the final position recorded in the buffer region and not the error stop position.

(5) Before executing the user program that is being interrupted, a "stop position return function" is used to accurately return the EOAT 12 to the "error stop position" that was stored after the error occurred.

(6) From the strict "error stop position", the interrupted user program is reactivated based on saved execution context, and the application processing work (coating work) is resumed. In the present invention, (although various methods can be considered) it does not matter whether the above-described series of operations for error recovery are performed by an operator, performed by an activation apparatus such as an external PLC, or automatically performed by the robot operation control unit 211.

Figure 10:
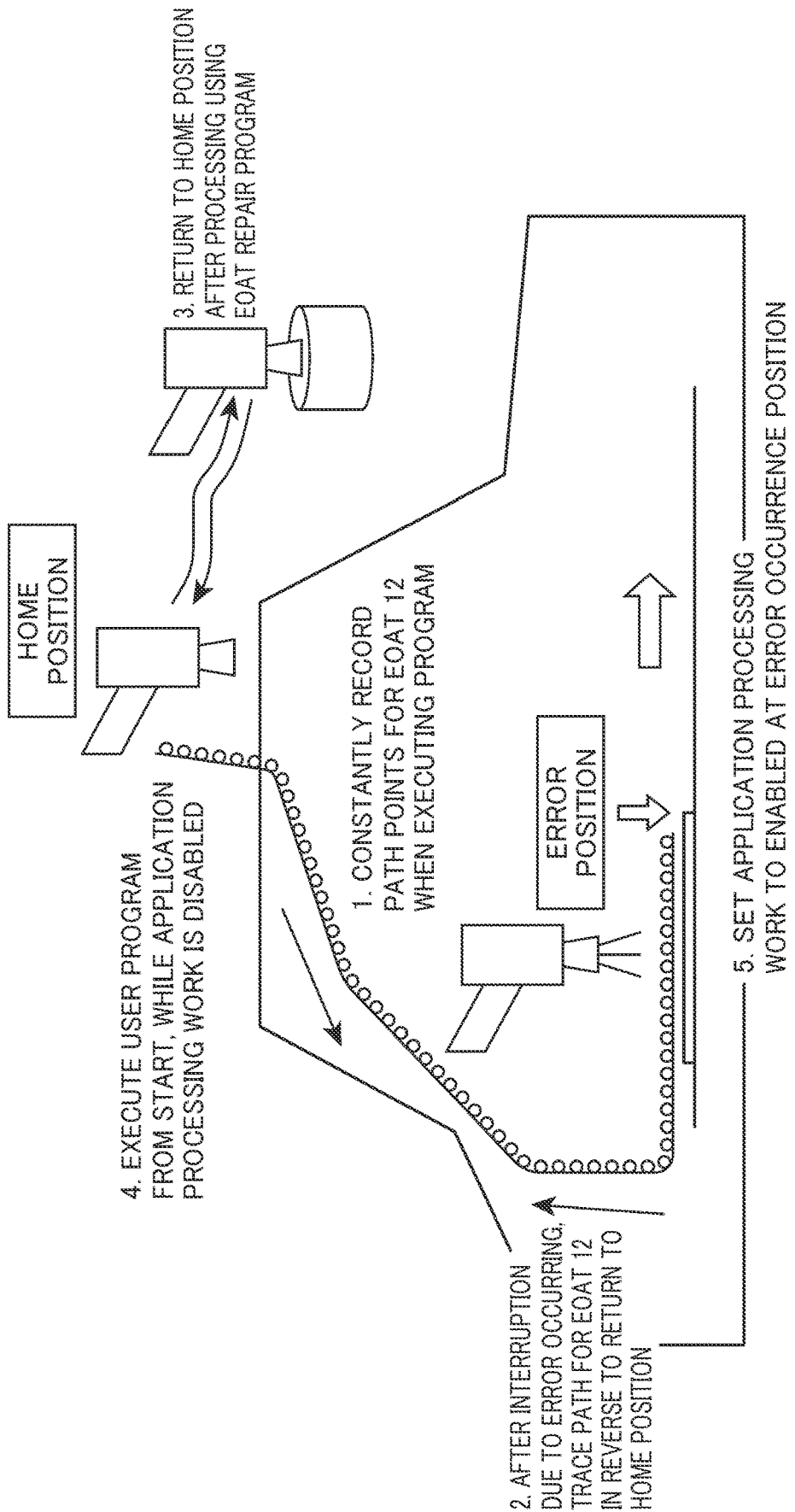
FIG. 10 is a schematic view of a second method according to the present disclosure for causing a tool on a robot arm tip to exit from a work region, repairing the tool, and then causing processing to resume from an original position.

FIG. 10 is a schematic view for describing a second embodiment which corresponds to a method for resuming after coating work is interrupted. A second method is, as illustrated in FIG. 10, after an interruption due to an error occurring, to automatically—or in accordance with a command from an external unit—exit by tracing in reverse a path that was recorded when the user program was executing, disable the application processing work (coating work) after the repair, execute the user program from the start thereof, enable the application processing work when the error occurrence position is returned to, and then resume the application processing work.

A processing procedure for this second embodiment is as illustrated in FIG. 10, and is as follows.

(1) During execution of a user program, the position of the EOAT 12 is recorded in a buffer region (path recording unit 222 in FIG. 5) every specific period.

(2) Differing to the first embodiment, there is no need to, after an interruption due to an error occurring, store the "error stop position" for the robot arm 11 or the execution context for the user program, but an "error occurrence position" for the instant the error occurred is stored. After the user program is interrupted, the EOAT 12 is caused to safely exit from the work region. Therefore, a "backward exit" order is executed, recorded positions for the EOAT 12 are traced in reverse, and the EOAT 12 is caused to move to the home position.

(3) A defect for the EOAT 12 is corrected. The EOAT 12 is repaired manually by an operator or by executing a repair program that was created by a user. This case includes operation to move (jog) the EOAT 12 manually or move the EOAT 12 using the repair program. After the defect for the EOAT 12 is corrected, the EOAT 12 is returned to the home position.

(4) Subsequently, the application processing work (coating work) is temporarily disabled, and the user program is activated from the start thereof.

(5) The instant that the EOAT 12 has returned to the error occurrence position, the application processing work is reset to enabled, and the interrupted application processing work is caused to resume. (At this time, there is not necessarily a need to temporarily stop/resume the user program, and it is also possible to resume application processing without stopping operation by the robot arm 11)

Figure 1:
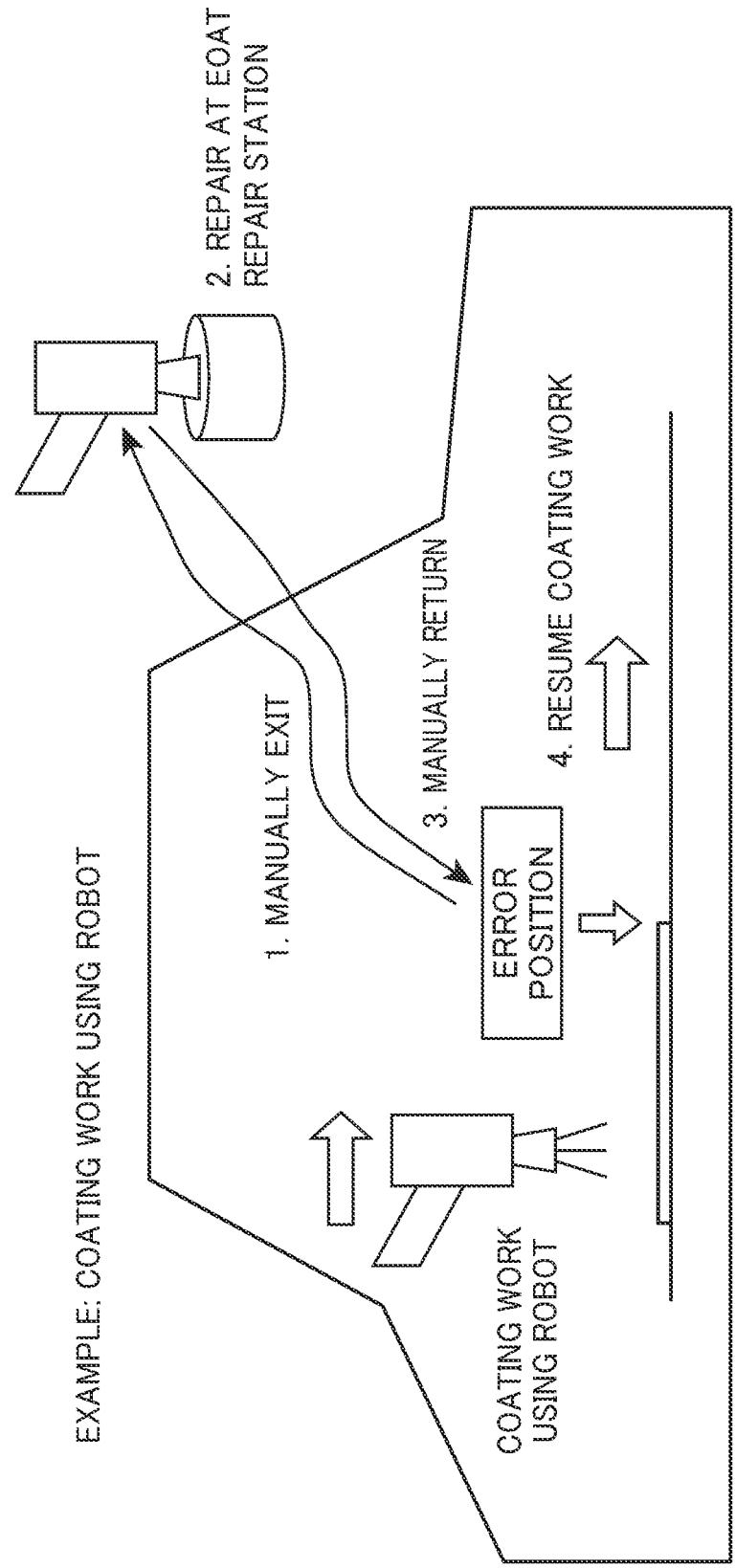
FIG. 1 is a schematic view of a conventional method for causing a tool on a robot arm tip to exit from a work region, repairing the tool, and then causing processing to resume from an original position.
Figure 2:
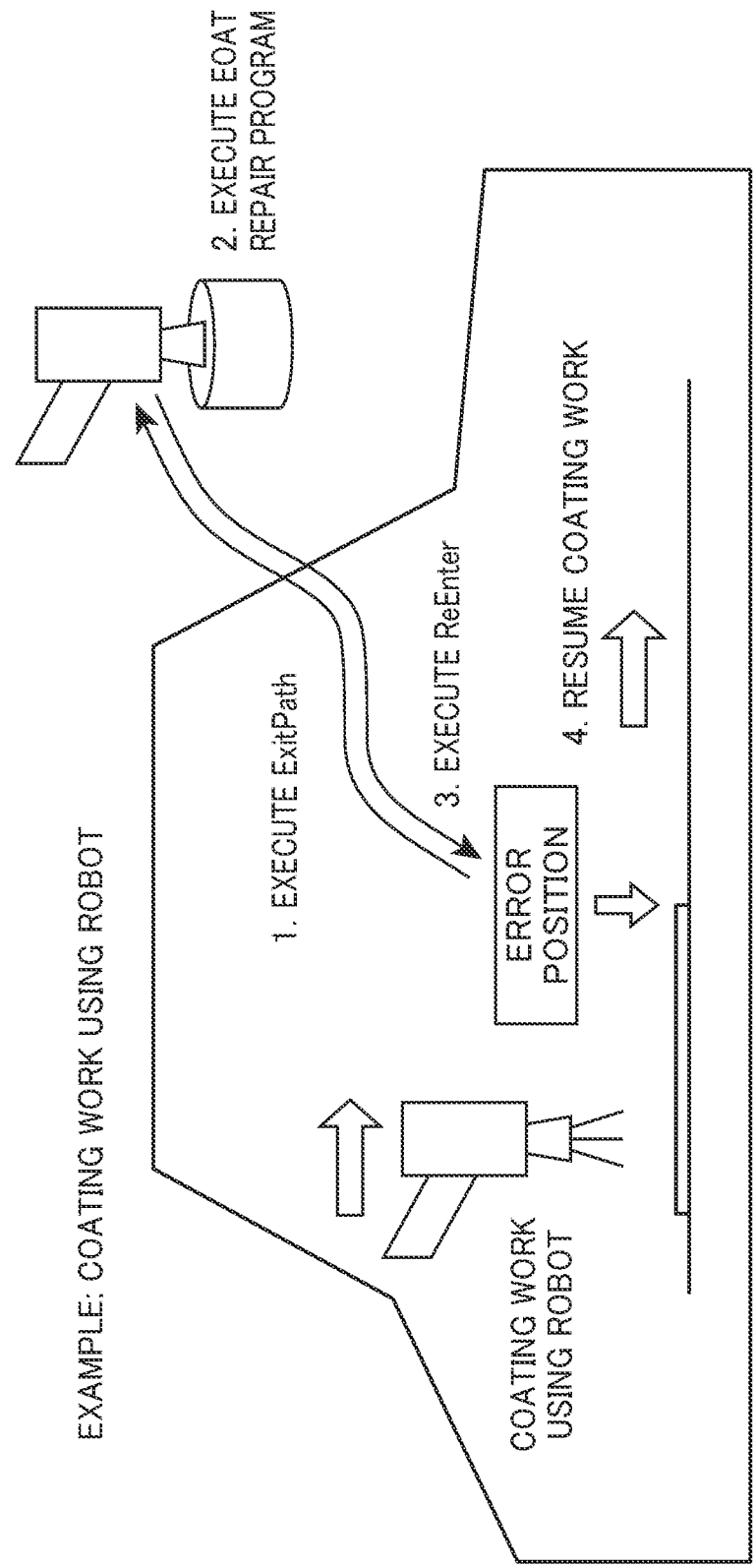
FIG. 2 is a schematic view of another conventional method for causing a tool on a robot arm tip to exit from a work region, repairing the tool, and then causing processing to resume from an original position.
Figure 3:
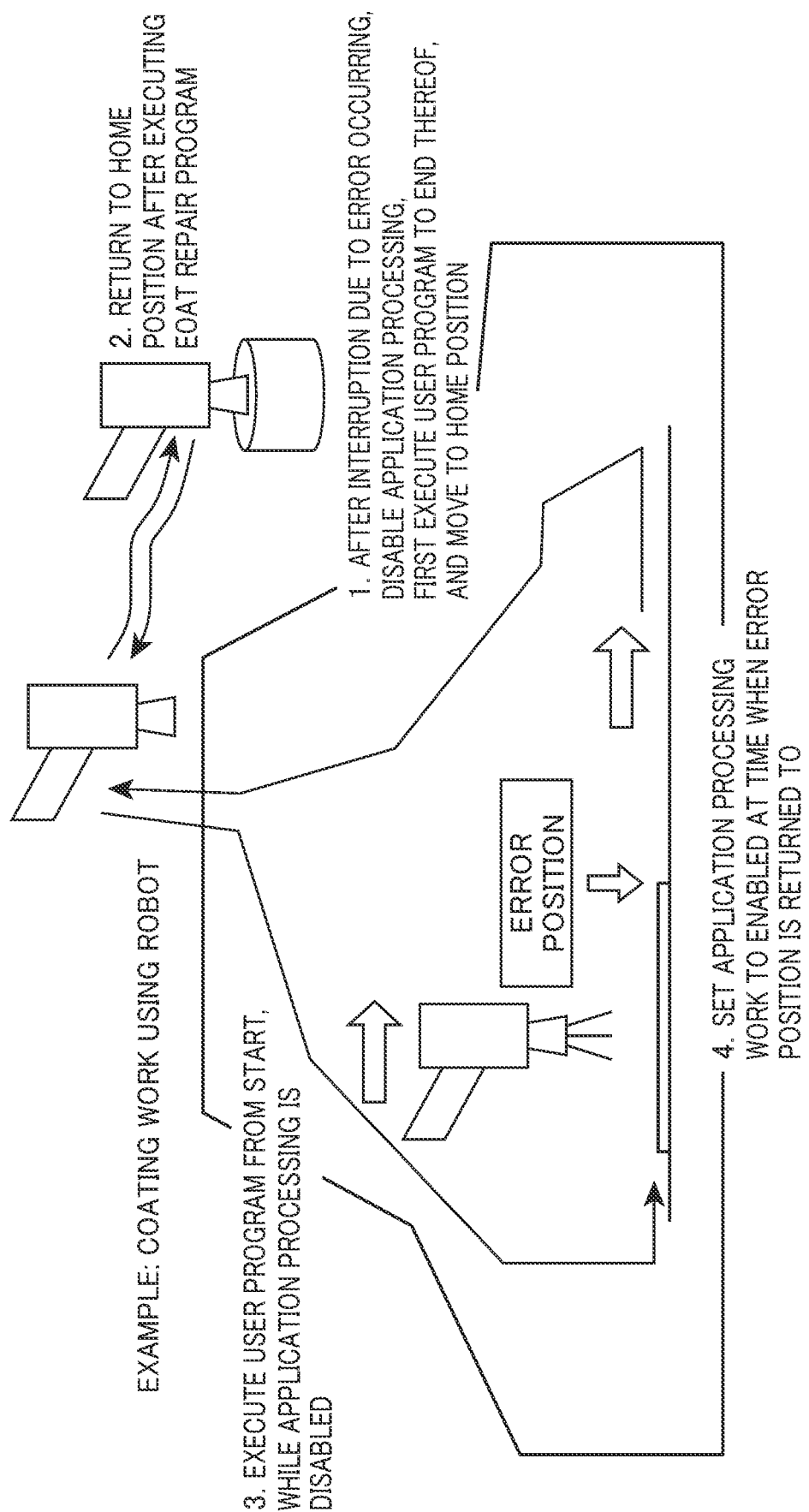
FIG. 3 is a schematic view of yet another conventional method for causing a tool on a robot arm tip to exit from a work region, repairing the tool, and then causing processing to resume from an original position.

A third embodiment which corresponds to a method for resuming after coating work is interrupted is combining the third conventional example illustrated in FIG. 3 with the second embodiment illustrated in FIG. 10. Therefore, the second embodiment illustrated in FIG. 10 is employed in a case where the error occurrence position is not beyond a reference position indicated within the user program, and the third conventional example illustrated in FIG. 3 is employed in a case where the error occurrence position is beyond the reference position. In other words, when starting restoration processing automatically or in accordance with a command from an external unit, exiting is performed by tracing a path recorded when executing the user program in a case where the error occurrence position is not beyond the reference position and exiting is performed by temporarily disabling the application processing work and executing the user program to the end thereof in a case where the error occurrence position is beyond the reference position. After the repair, the user program, for which the application processing work (coating work) remains in the temporarily disabled state, is executed from the start thereof, and the application processing work is enabled and resumed the instant the error occurrence position is returned to.

A processing procedure for this third embodiment is as follows.

(1) During execution of a user program, the position of the EOAT 12 is recorded in a buffer region (path recording unit 222 in FIG. 5) every specific period.

(2) At the time of an interruption due to an error occurring, a determination is made as to whether the error occurrence position is beyond a predetermined reference point described within the user program.

(3) In a case where the error occurrence position is not beyond the predetermined reference point, in order to cause the EOAT 12 to safely exit from the work region, similarly to in the second embodiment illustrated in FIG. 10, a "backward exit" order is executed, the recorded positions for the EOAT 12 are traced in reverse, and the EOAT 12 is caused to move to the home position.

(4) In a case where the error occurrence position is beyond the predetermined reference point, similarly to the third conventional example illustrated in FIG. 3, the application processing work is temporarily disabled and the user program is executed until the end thereof to safely cause the EOAT 12 to exit, and the EOAT 12 is caused to move to the home position.

(5) A defect for the EOAT 12 is corrected. The EOAT 12 is repaired manually by an operator or by executing a repair program that was created by a user. This case includes operation to move (jog) the EOAT 12 manually or move the EOAT 12 using the repair program. After the defect for the EOAT 12 is corrected, the EOAT 12 is returned to the home position.

(6) Subsequently, the application processing work (coating work) is temporarily disabled, and the user program is activated from the start thereof.

(7) The instant that the EOAT 12 has returned to the error occurrence position, the application processing work is reset to enabled, and the interrupted application processing work is caused to resume.

Next, for each of the first through third embodiments in the present disclosure, an operation procedure for resuming after application processing work (coating work) is interrupted is described using a flow chart.

Figure 11:
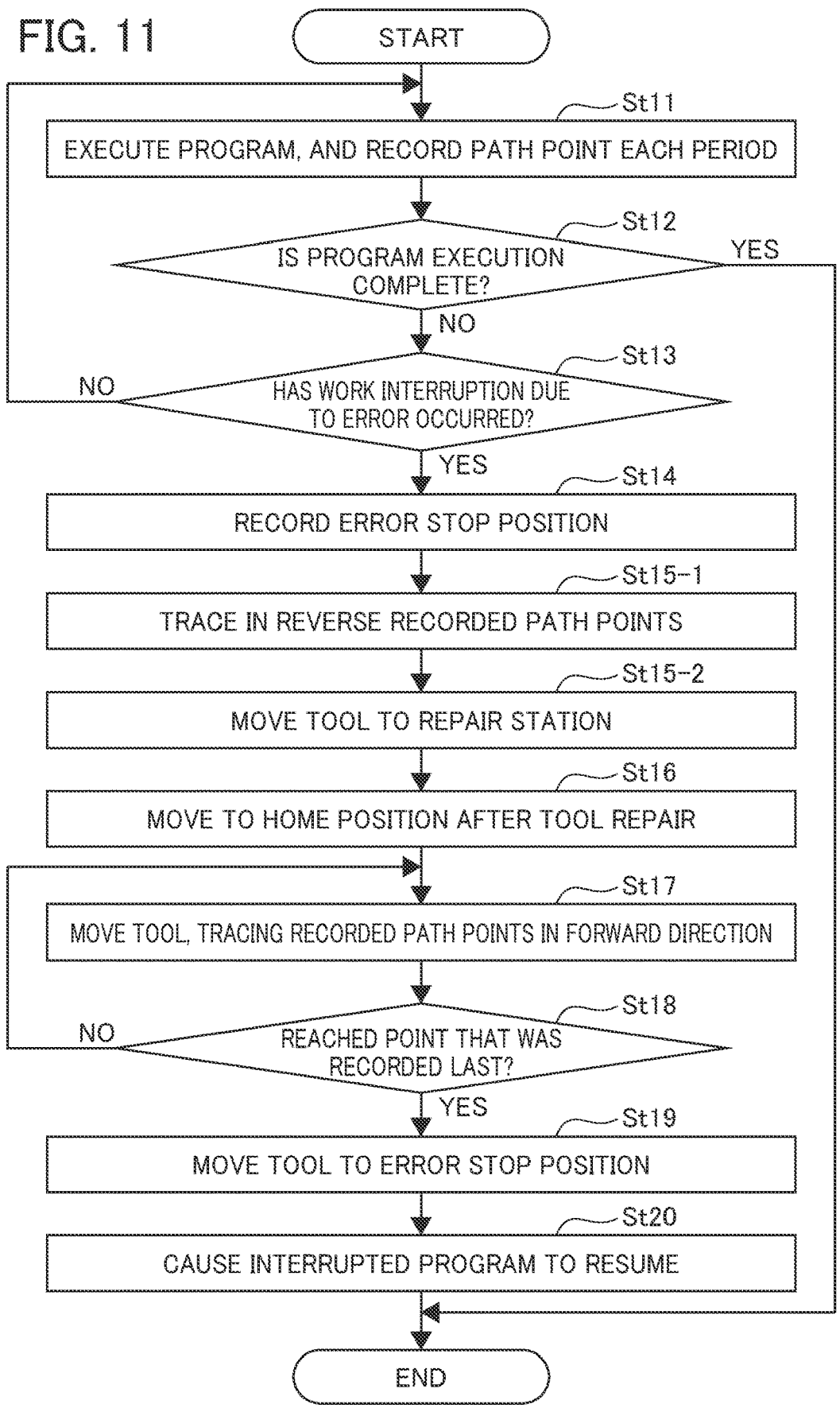
FIG. 11 is a flow chart for the first implementation method according to the present disclosure.

Firstly, an operation procedure that is for resuming after application processing work (coating work) is interrupted and is according to the first embodiment is described using a flow chart in FIG. 11. As illustrated in FIG. 11, firstly a user program is executed and application processing work is started, but when the user program is executing, a path point for the tool (the EOAT 12) on the robot arm tip is recorded each specific period (Step St11). Next, a determination is made as to whether execution of the user program has completed (Step St12). If execution of the user program is complete (case for YES in Step St12), this flow ends. If execution of the user program is not complete (case for NO in Step St12), then next a determination is made as to whether interruption of application processing work due to an error has occurred (Step St13).

If interruption of application processing work due to an error has not occurred (case for NO in Step St13), Step St11 is returned to, the user program is continued, and execution of the user program completing or an interruption event due to an error arising is waited for. If interruption of application processing work due to an error has occurred (case for YES in Step St13), then next the error stop position is recorded (Step St14).

Next, the recorded path points are traced in reverse to cause the tool (the EOAT 12) to exit from the work region for application processing work to the home position (Step St15-1), and thereafter cause the tool to move to the repair station 40 (Step St15-2). After the tool (the EOAT 12) is repaired and the error occurrence cause is removed, the tool is moved to the home position (Step St16).

Figure 12:
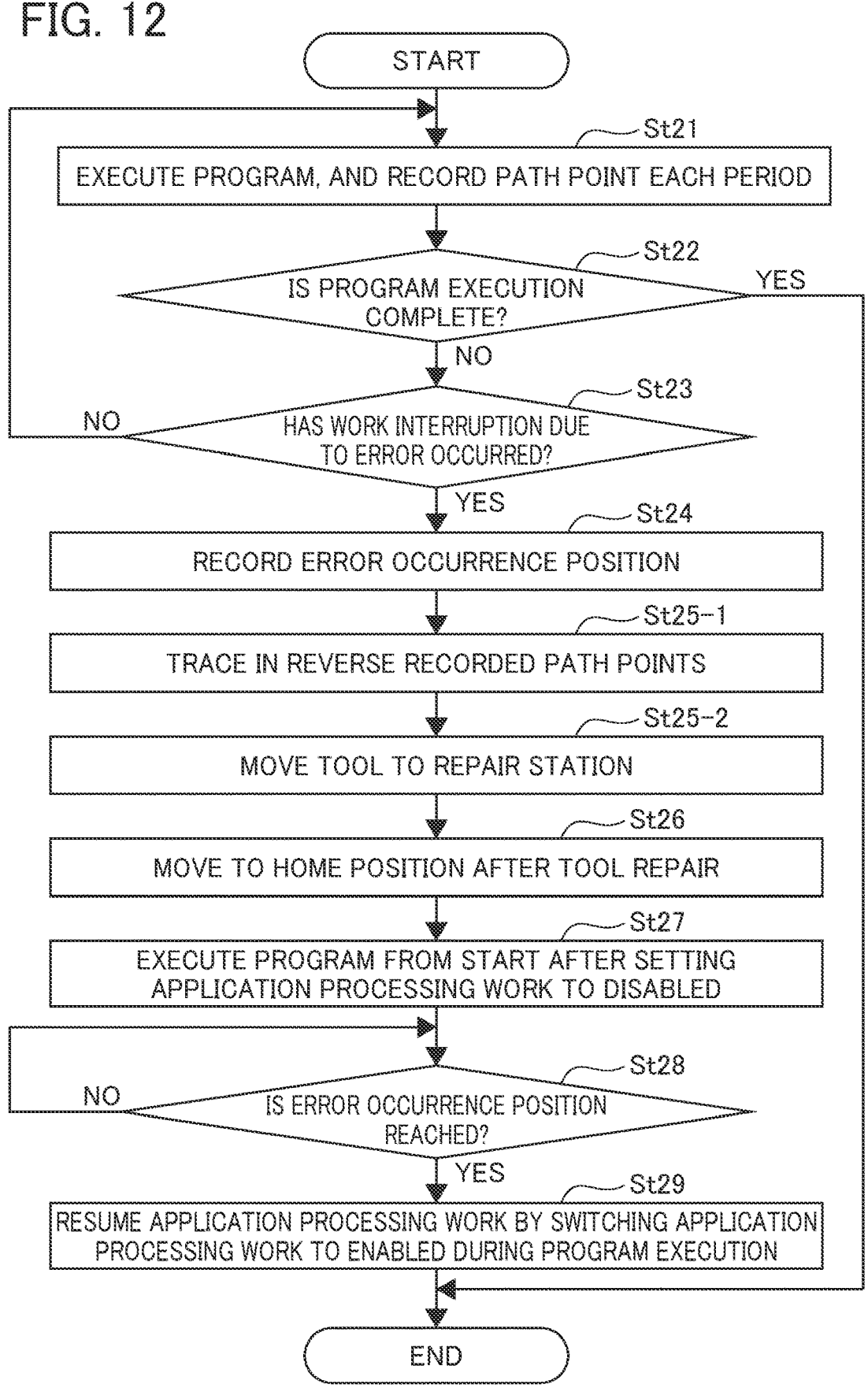
FIG. 12 is a flow chart for the second implementation method according to the present disclosure.

Next, the recorded path points are traced in the forward direction to thereby cause the tool (the EOAT 12) to move to the error stop position (Step St17). A determination is made as to whether the tool (the EOAT 12) has arrived at the point that was recorded last (Step St18). If the last recorded point has not been reached (case for NO in Step St18), Step St17 is returned to, and reaching the last recorded point is waited for. If the point recorded last is reached (case for YES in Step St18), the tool is caused to move to the error stop position (Step St19). From the error stop position, the interrupted user program is reactivated to cause the application processing work to resume (Step St20). This application processing work is caused to complete, and this flow ends. Note that, more accurately, after Step St20, Step St11 is returned to, and a loop for Step St11 through Step St20 is repeated until YES in Step St12—in other words until execution of the user program completes, but when such a loop is created a similar loop becomes necessary in the flow charts for later-described FIG. 12 and FIG. 13 in addition to the flow chart for FIG. 11, and the flow charts would become complex and hard to understand. Accordingly, FIGS. 11 through 13 are made to be views in which the abovementioned loop is omitted and there is an end after the final step. In FIG. 12 and FIG. 13, supplementary explanation for omitting similar loops is omitted.

Next, an operation procedure that is for resuming after application processing work (coating work) is interrupted and is according to the second embodiment is described using a flow chart in FIG. 12. As illustrated in FIG. 12, firstly a user program is executed and application processing work is started, but when the user program is executing, a path point for the tool (the EOAT 12) on the robot arm tip is recorded each specific period (Step St21). Next, a determination is made as to whether execution of the user program has completed (Step St22). If execution of the user program is complete (case for YES in Step St22), this flow ends. If execution of the user program is not complete (case for NO in Step St22), then next a determination is made as to whether interruption of application processing work due to an error has occurred (Step St23).

If interruption of application processing work due to an error has not occurred (case for NO in Step St23), Step St21 is returned to, the user program is continued, and execution of the user program completing or an interruption event due to an error arising is waited for. If interruption of application processing work due to an error has occurred (case for YES in Step St23), then next an error occurrence position at which the error occurred and application processing work was interrupted is recorded (Step St24).

Next, the recorded path points are traced in reverse to cause the tool (the EOAT 12) to exit from the work region for application processing work (Step St25-1), and cause the tool to move to the repair station 40 (Step St25-2). After the tool (the EOAT 12) is repaired and the error occurrence cause is removed, the tool is moved to the home position (Step St26).

Next, using the repaired tool (the EOAT 12) for which the error occurrence cause has been removed, the user program is executed from the start thereof after disabling the application processing work (coating work), and the tool (the EOAT 12) is cause to move in the forward direction (Step St27). A determination is made as to whether the tool (the EOAT 12) has arrived at the error occurrence position (Step St28). If the error occurrence position has not been reached (case for NO in Step St28), Step St27 is returned to, and reaching the error occurrence position is waited for. If the error occurrence position is reached (case for YES in Step St28), in that instant, the application processing work is enabled from the error occurrence position, the user program is continued, and the application processing work is caused to resume (Step St29). This application processing work is caused to complete, and this flow ends.

Next, an operation procedure that is for resuming after application processing work (coating work) is interrupted and is according to the third embodiment is described using a flow chart in FIG. 13. As illustrated in FIG. 13, firstly a user program is executed and application processing work is started, but when the user program is executing, a path point for the tool (the EOAT 12) on the robot arm tip is recorded each specific period (Step St301). Next, a determination is made as to whether execution of the user program has completed (Step St302). If execution of the user program is complete (case for YES in Step St302), this flow ends. If execution of the user program is not complete (case for NO in Step St302), then next a determination is made as to whether interruption of application processing work due to an error has occurred (Step St303).

If interruption of application processing work due to an error has not occurred (case for NO in Step St303), Step St301 is returned to, the user program is continued, and execution of the user program completing or an interruption event due to an error arising is waited for. If interruption of application processing work due to an error has occurred (case for YES in Step St303), then next an error occurrence position at which the error occurred and application processing work was interrupted is recorded (Step St304).

Next, a determination is made as to whether the error occurrence position is beyond a predetermined reference point (Step St305). In a case where the error occurrence position is not beyond the predetermined reference point (case for NO in Step St305), tracing the recorded path points in reverse, the tool (the EOAT 12) is caused to exit from the work region for the application processing work and return to the home position (Step St306-1) and is caused to move to the repair station 40 (Step St306-2). After the tool (the EOAT 12) is repaired and the error occurrence cause is removed, the tool is moved to the home position (Step St308).

In a case where the error occurrence position is beyond the predetermined reference point (case for YES in Step St305), from the error occurrence position, the user program is reactivated after the application processing work is set to disabled, the user program is executed until the end thereof, and the tool (the EOAT 12) is caused to exit from the work region for the application processing work and return to the home position (Step St307-1), and is caused to move to the repair station 40 (Step St307-2). After the tool (the EOAT 12) is repaired and the error occurrence cause is removed, the tool is moved to the home position (Step St308).

Next, using the repaired tool (the EOAT 12) for which the error occurrence cause has been removed, the user program is executed from the start thereof after temporarily disabling the application processing work (coating work), and the tool (the EOAT 12) is cause to move in the forward direction (Step St309). A determination is made as to whether the tool (the EOAT 12) has arrived at the error occurrence position (Step St310). If the error occurrence position has not been reached (case for NO in Step St310), Step St309 is returned to, and reaching the error occurrence position is waited for. If the error occurrence position is reached (case for YES in Step St310), in that instant, the application processing work is enabled from the error occurrence position, the user program is continued, and the application processing work is caused to resume (Step St311). This application processing work is caused to complete, and this flow ends.

Next, description is given regarding effects of the robot operation method and robot system according to the invention according to the present disclosure, as well as advantageous points and unfavorable points in a comparison between respective embodiments. Firstly, in a case of causing a tool (EOAT) attached to a robot arm tip to exit from an application processing work region, it is possible to give, as common effects for each embodiment pertaining to the robot operation method and robot system according to the invention according to the present disclosure, being able to execute without incurring time and effort such as requiring a human resource or requiring a plurality of user programs to be taught. Path points for the tool (EOAT), which is moved in a forward direction from a start point for execution of a user program for application processing work, are automatically and periodically recorded and, at a time of exit/return for the tool (EOAT), it is sufficient if there is travel in the reverse direction/forward direction following these recorded points. Therefore, means that are common to each embodiment are that everything is automatically performed, a human resource is not required, and a separate user program apart from the user program for application processing work is not required. Accordingly, an effect that it is possible to more simply resume after an interruption without incurring time and effort is achieved.

It is possible to give, as other common effects for each embodiment pertaining to a robot operation method and robot system according to an invention according to the present disclosure, an advantageous effect such as being able to perform restoration work quickly, without taking time, and without a mistake such as allowing the tool to collide with an obstacle arising. In a case of manually performing restoration work, in which a tool is caused to exit from a work region and returned to the interruption position, there are many mistakes such as a collision between the tool and an obstacle in a complicated situation where many obstacles such as another apparatus are installed in the vicinity of an exit/return path. If work is performed carefully such that a mistake does not arise, the restoration work will take time. In contrast to this, in embodiments according to the present disclosure, because a tool automatically travels in the reverse direction/forward direction following recorded points, it is possible to perform restoration work quickly without a collision mistake arising.

Next, description is given regarding advantageous points and unfavorable points in a comparison between respective embodiments pertaining to the robot operation method and robot system according to the invention according to the present disclosure. In the first (first) embodiment, when returning a tool to the error stop position by following recorded points, strictly speaking the tool returns to the last recorded point instead of the error stop position. After an error occurs and after application processing work is interrupted, there are causes where the tool continues to travel due to, inter alia, inertia for the tool and the error stop position differs to the last recorded point. In this case, it is necessary to use a stop position return function to accurately return to the stop position for after the application processing work was interrupted, in other words to the error stop position. In contrast to this, in the second and third embodiments, because the tool is returned to the error occurrence position by executing the user program for which application processing work is disabled, the error occurrence position is accurately passed through. Accordingly, work to return to the error stop position using a stop position return function is unnecessary. In contrast, during travel of the tool due to execution of the user program, the application processing work must be switched from disabled to enabled the instant the error occurrence position is returned to, and more a more advanced technique is required.

The first and second embodiments have the disadvantage that the return path for the exit of the tool lengthens in a case where the error occurrence position is close to an end position in the overall travel path for the tool due to execution of the user program. In other words, in a case where the error occurrence position is close to the end position in the overall travel path for the tool due to execution of the user program, exiting by advancing to the end of the remaining path enables an exit that is quicker than returning along the path that has already been traveled on. The third embodiment can, in accordance with the error occurrence position, separately use exiting by returning on a traveled path and exiting by advancing to the end of the remaining path, and can be said to have overcome a disadvantage of the first and second embodiments.

In relation to working the present invention, description is given above regarding embodiments, but the present invention is not limited whatsoever to these embodiments, and it goes without saying that the present invention can be worked in various aspects within a scope that does not deviate from the spirit of the present invention. For example, details of the application processing work are not limited to coating with paint and also include coating with an adhesive or a sealing material, and furthermore application can be made to various types of surface processing or pressing/injection work, plasma irradiation, laser welding, arc welding, and spot welding. In addition, description was given in examples regarding a method for periodically recording the current position of the robot during execution of a user program, but it is also possible to cause the robot to move in the reverse direction by another method, such as a method in which teaching numbers (or line numbers) executed in the user program are stored in an order of execution, for example. This method has the advantage of requiring less storage capacity, but requires execution to be carried out with greater care, such as considering the mode of operation (such as linear interpolation, joint interpolation, or circular interpolation), operating speed, etc. to be the same as that for when moving forward, such that the robot trajectory becomes similar to the original trajectory for when executing with forward movement.

EXPLANATION OF REFERENCE NUMERALS

10 . . . Robot
11 . . . Robot arm
12 . . . EOAT (tool)
13 . . . Transmission/reception apparatus for robot
14-1 through 14-*n* . . . Servomotor
15 . . . EOAT position calculation unit
20 . . . Robot control apparatus
21 . . . Processing unit (CPU)

211 . . . Robot operation control unit
212 . . . Error occurrence position (error stop position) determination unit
22 . . . Storage unit
221 . . . Existing setting data storage unit
222 . . . Path recording unit
23 . . . Transmission/reception unit for robot control apparatus
30 . . . Workpiece
40 . . . Repair station (error cause repair unit)

The invention claimed is:

1. A robot system configured to use a user program to perform application processing work while causing a tool attached to an arm tip of a robot to travel along a desired trajectory, the robot system comprising:
   a non-transitory memory configured to record a path based on a current position of the tool belonging to the robot while the tool belonging to the robot travels in accordance with execution of the user program, the recorded path not being necessarily exactly the same as a predetermined trajectory traced in accordance with the user program; and
   an error occurrence position determination unit configured to, when the application processing work is interrupted due to an error occurring during execution of the user program, determine whether an error occurrence position is not beyond a predetermined reference position in the desired trajectory; and
   a robot operation control unit configured to cause the tool belonging to the robot to execute the user program when an error occurs during execution of the user program and the application processing work is interrupted, trace, in a reverse direction, the path recorded during travel of the tool belonging to the robot to thereby cause the tool to exit from a work region in a case where an error occurrence point is at a location not beyond the predetermined reference point in the desired trajectory or cause the tool to exit from the work region by executing the user program until the end in a state where the application processing work is disabled in a case where the error occurrence point is at a location beyond the predetermined reference point in the desired trajectory, provide a user with an opportunity to repair a cause of an error, after removal of the cause of the error, disable the application processing work and execute the user program from the start using the tool for which the cause of the error has been removed, and enable the application processing work at a time when the tool reaches the error occurrence point again to cause the interrupted application processing work that is in accordance with the user program to resume from the error occurrence point.

2. The robot system according to claim 1, wherein a position for resuming the application processing work can be finely adjusted forward or backward.

3. The robot system according to claim 1, wherein
in a duration until resumption of the application processing work after the occurrence of the error, the duration being while the path is being traced in the reverse direction and while the path is being traced in a forward direction, a height position for the tool can be vertically and finely adjusted, and
the height position for the tool is able to return to a height for an original teaching position when resuming the application processing work.

4. A robot operation method configured to use a user program to perform application processing work while causing a tool attached to an arm tip of a robot to travel along a desired trajectory, the robot operation method comprising:
   a step of recording a path based on a current position of the tool belonging to the robot while the tool belonging to the robot travels in accordance with execution of the user program, the recorded path not being necessarily exactly the same as a predetermined trajectory traced in accordance with the user program;
   a step of determining, when the application processing work is interrupted due to an error occurring during execution of the user program, whether an error occurrence point is not beyond a predetermined reference point in the desired trajectory;
   a step of, in a case where the error occurrence point is at a location that is not beyond a predetermined reference point in the desired trajectory, tracing, in a reverse direction, the path recorded during travel of the tool belonging to the robot to thereby cause the tool to exit from a work region, and
   in a case where the error occurrence point is at a location beyond the predetermined reference point in the desired trajectory, causing the tool to exit from the work region by executing the user program until the end in a state where the application processing work is disabled, and causing the tool to move to a repair station;
   a step of removing a cause of an error at the repair station; and
   a step of disabling the application processing work, executing the user program from the start using the tool for which the cause of the error has been removed, and enabling the application processing work at a time when the tool has reached the error occurrence point again to resume from the error occurrence point the interrupted application processing work in accordance with the user program.

5. The robot operation method according to claim 4, wherein a position for resuming the application processing work can be finely adjusted forward or backward.

6. The robot operation method according to claim 4, wherein
in a duration until resumption of the application processing work after the occurrence of the error, the duration being while the path is being traced in the reverse direction and while the path is being traced in a forward direction, a height position for the tool can be vertically and finely adjusted, and
the height position for the tool is able to return to a height for an original teaching position when resuming the application processing work.

* * * * *